US008661700B2

(12) United States Patent
Briggs et al.

(10) Patent No.: US 8,661,700 B2
(45) Date of Patent: Mar. 4, 2014

(54) SMART PROBE

(71) Applicant: Faro Technologies, Inc., Lake Mary, FL (US)

(72) Inventors: Clark H. Briggs, DeLand, FL (US); Keith George Macfarlane, Lake Mary, FL (US); Frederick John York, Longwood, FL (US); Marc Barber, Deltona, FL (US)

(73) Assignee: Faro Technologies, Inc., Lake Mary, FL (US)

( * ) Notice: Subject to any disclaimer, the term of this patent is extended or adjusted under 35 U.S.C. 154(b) by 0 days.

(21) Appl. No.: 13/738,226

(22) Filed: Jan. 10, 2013

(65) Prior Publication Data
US 2013/0118020 A1 May 16, 2013

Related U.S. Application Data

(63) Continuation of application No. 12/813,787, filed on Jun. 11, 2010, now abandoned, which is a continuation of application No. 11/848,266, filed on Aug. 31, 2007, now Pat. No. 7,735,234.

(60) Provisional application No. 60/841,648, filed on Aug. 31, 2006.

(51) Int. Cl.
G01B 5/008 (2006.01)
G01B 5/012 (2006.01)

(52) U.S. Cl.
USPC ................... 33/503; 33/558; 33/502

(58) Field of Classification Search
USPC ........... 33/502, 503, 504, 556, 557, 558, 559, 33/560, 561; 73/1.79, 1.81; 702/94, 95
See application file for complete search history.

(56) References Cited

U.S. PATENT DOCUMENTS

| 4,588,339 | A | | 5/1986 | Bilz | |
|---|---|---|---|---|---|
| 5,011,297 | A | * | 4/1991 | Tittl | 374/141 |
| 5,195,826 | A | * | 3/1993 | Enderle et al. | 374/142 |
| 5,526,576 | A | * | 6/1996 | Fuchs et al. | 33/503 |
| 5,544,953 | A | | 8/1996 | Viertl | |
| 5,794,356 | A | | 8/1998 | Raab | |
| 6,219,928 | B1 | | 4/2001 | Raab et al. | |
| 6,487,896 | B1 | * | 12/2002 | Dall'Aglio | 73/104 |
| 6,502,249 | B2 | * | 1/2003 | Cunningham et al. | 2/338 |

(Continued)

FOREIGN PATENT DOCUMENTS

| EP | 155662 A2 * | 9/1985 | B23Q 3/155 |
|---|---|---|---|
| EP | 0546784 A2 | 6/1993 | |

(Continued)

OTHER PUBLICATIONS

Horn, V.; "Non-Contact Tool Identification"; Industrial and Production Engineering; vol. 11, No. 2; pp. 42-43; Jan. 1987.

(Continued)

Primary Examiner — R. A. Smith
(74) Attorney, Agent, or Firm — Cantor Colburn LLP

(57) ABSTRACT

The present system, method, article of manufacture, software, and apparatus is an "intelligent" probe system and components thereof and may openly encompass, in at least an embodiment, an embedded IC chip located in an interchangeable probe(s) which offers repeatable, fast, easy, and error free probe swapping on a CMM.

5 Claims, 11 Drawing Sheets

(56) References Cited

U.S. PATENT DOCUMENTS

| | | | |
|---|---|---|---|
| 6,601,311 B2 | 8/2003 | McMurtry et al. | |
| 7,395,606 B2 * | 7/2008 | Crampton | 33/503 |
| 2002/0032541 A1 | 3/2002 | Raab et al. | |
| 2004/0185706 A1 * | 9/2004 | Price et al. | 439/488 |
| 2005/0166413 A1 * | 8/2005 | Crampton | 33/503 |
| 2009/0241360 A1 * | 10/2009 | Tait et al. | 33/502 |
| 2010/0135357 A1 | 6/2010 | Chancy | |

FOREIGN PATENT DOCUMENTS

| | | | | |
|---|---|---|---|---|
| JP | 62502569 A | | 10/1987 | |
| JP | 63048414 A | | 3/1988 | |
| JP | 2000306063 A | | 11/2000 | |
| JP | 2000346601 A | | 12/2000 | |
| JP | 2002506989 A | | 3/2002 | |
| JP | 2002-228434 A | | 8/2002 | |
| JP | 2003025176 A | * | 1/2003 | B23Q 3/155 |
| JP | 2005181293 A | | 7/2005 | |
| JP | 2005265700 A | | 9/2005 | |
| WO | 8701798 A1 | | 3/1987 | |
| WO | WO 9735164 A1 | * | 9/1997 | G01B 21/04 |
| WO | 9947884 | | 9/1999 | |

OTHER PUBLICATIONS

International Search Report and Written Opinion dated Apr. 29, 2008 for PCT Application No. PCT/US2007/019279.

Malle, K.; "Werkzeuge Im Zentrum Peripherer Intellingenz"; VDI Z, Springer VDI Verlag, Dusseldorf, DE, vol. 132, No. 6; pp. 2-6; Jun. 1, 1990 (with English Abstract).

* cited by examiner ated on Jun. 15, 2010), and U.S. Provisional Application Ser. No. 60/841,648, filed Aug. 31, 2006, the disclosures of all of which are incorporated herein by reference in their entirety.

SMART PROBE

CROSS-REFERENCE TO RELATED APPLICATIONS

This application claims the benefit of Nonprovisional application Ser. No. 12/813,787 filed on Jun. 11, 2010, which claims the benefit of Non-Provisional application Ser. No. 11/848,266, filed on Aug. 31, 2007 (now U.S. Pat. No. 7,735, 234 issued on Jun. 15, 2010), and U.S. Provisional Application Ser. No. 60/841,648, filed Aug. 31, 2006, the disclosures of all of which are incorporated herein by reference in their entirety.

FIELD OF INVENTION

The present invention relates in general to measurement devices and methods including, but not limited to, coordinate measurement machines (CMM's).

BACKGROUND

Coordinate measurement machines (CMM's) measure parts, typically during manufacture, by probing the part to be measured with a probe such as a probe tip either by physical contact of the probe tip to the part, or by non-contact means. Angular encoders or other means may be located in the joints of the CMM robotic arm segments which hold the probe tip, and thus the position of the probe tip may be measured in a convenient coordinate system of the user's choosing. The operations of the CMM can also be coordinated with a CAD system or software for example.

Different probes or end effectors are used for different applications. For example, some areas of an object to be measured are difficult to reach and thus require specifically sized or shaped probes to be used on the CMM. Therefore, probes are commonly interchanged depending upon the characteristics of the region to be measured.

However, calibration is often a time consuming issue when using CMM's, especially when differently sized probes are interchanged and recalibration is typically required. In an assembly line environment for example, taking a CMM off-line for twenty minutes so that it can be recalibrated when a probe tip is changed can cause problems. Thus, manufacturers endeavor to set up their CMM's so that interchangeability of probes may be accurately performed with a minimum of downtime due to recalibration. However, further innovations are necessary.

Applicants' company, FARO Technologies, Inc., has several patents related to CMM's or related areas, including: U.S. Pat. Nos. 5,611,147, 5,794,356, 6,612,044, 6,820,346, 6,796,048, 6,920,697, 6,965,843, the entire disclosures of which are hereby incorporated herein by reference.

An example of a current system in use is the Romer Simcor "Infinite" series that uses a specific pin system associated with each specific interchangeable probe. In this system, a set of specific probes can be interchanged and identified by the CMM using a physical and/or electrical pin orientation which is unique to each probe and which must be entered and stored into a memory located in the CMM for example for later recognition. Thus, the number of probes that are useable is limited by the possible pin orientations. Also, probes of the same size/type cannot be distinguished. Additionally, a manual initial set-up and entry to a memory in the CMM for example is needed to record the dimensions and characteristics of each specific end effector in a useable database. Thus, the system is limited in scope of application, and it is not a fully automatic recognition system or a readily, easily, or infinitely expandable system. It is also not dynamically configurable or configurable on the fly during measurement. For example, if a particular algorithm or particular data is used with the probe, since the Romer probe does not have a processor or a memory, the algorithms or data used with the probe could not be easily updated in the probe itself.

SUMMARY

The present system, method, article of manufacture, and apparatus is an "intelligent" probe system and may comprise, in at least an embodiment, an embedded IC chip located in an interchangeable probe(s) which offers repeatable, fast, easy, and error free probe swapping on a CMM.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF EXEMPLARY EMBODIMENTS

Figure 1:
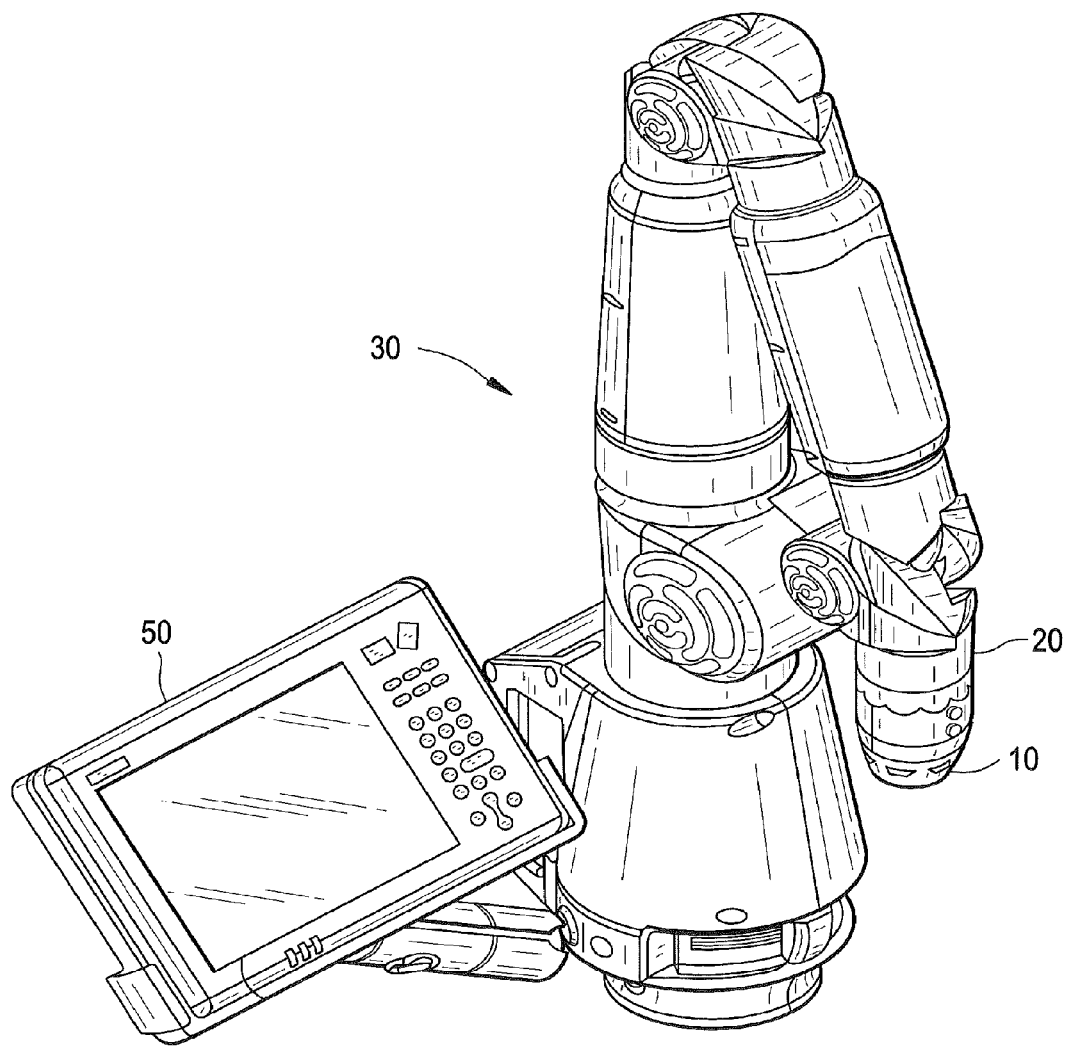
FIG. 1 is a front perspective view of a CMM with an articulated arm and an attached computer.

A CMM 30 is generally shown in FIG. 1.

Figure 2:
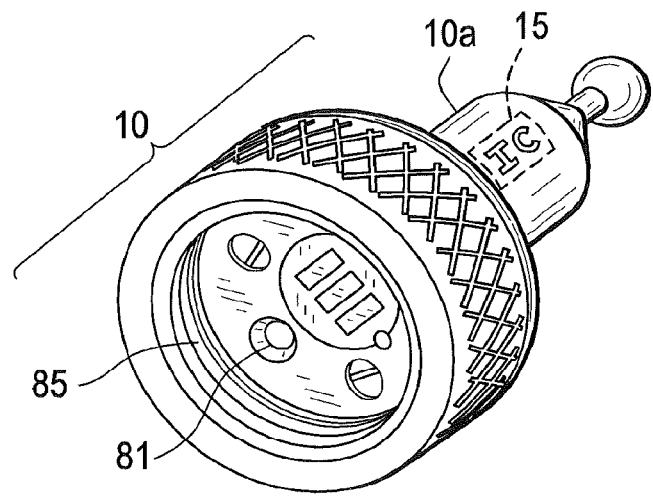
FIG. 2 is rear perspective view of an interchangeable probe with an embedded integrated circuit.
Figure 3:
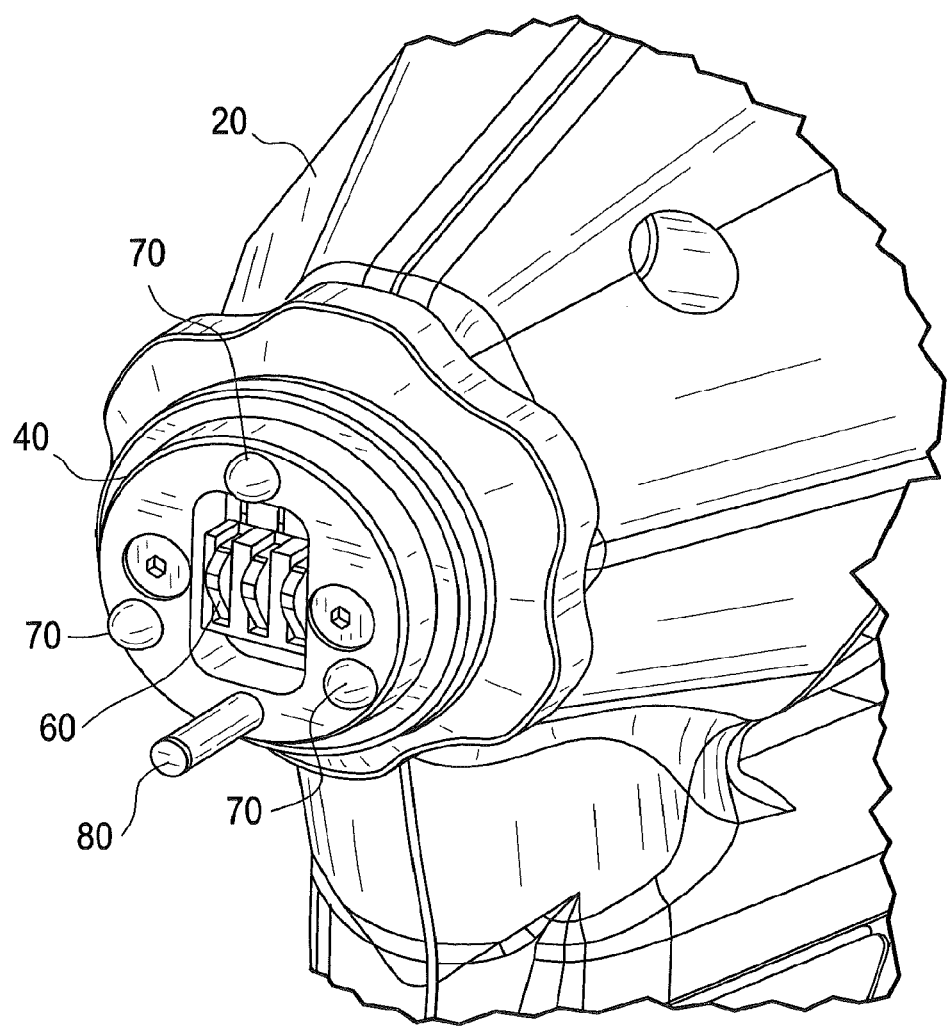
FIG. 3 is front perspective view of an attachment point for the interchangeable probe on the CMM.
Figure 4:
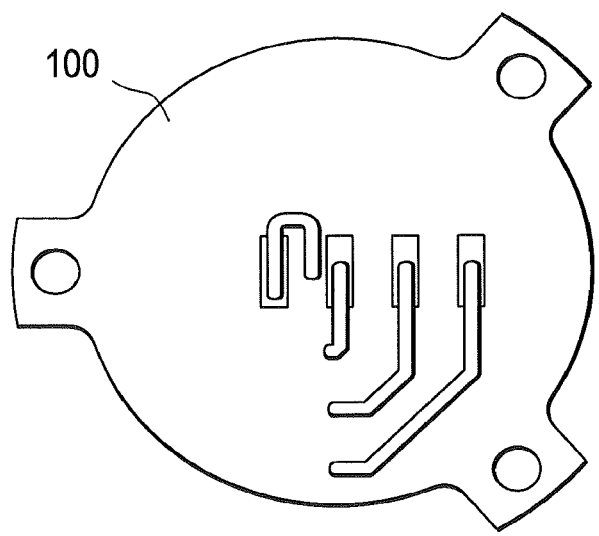
FIG. 4 is a top view of a concentric ring commutator of the second embodiment.
Figure 5:
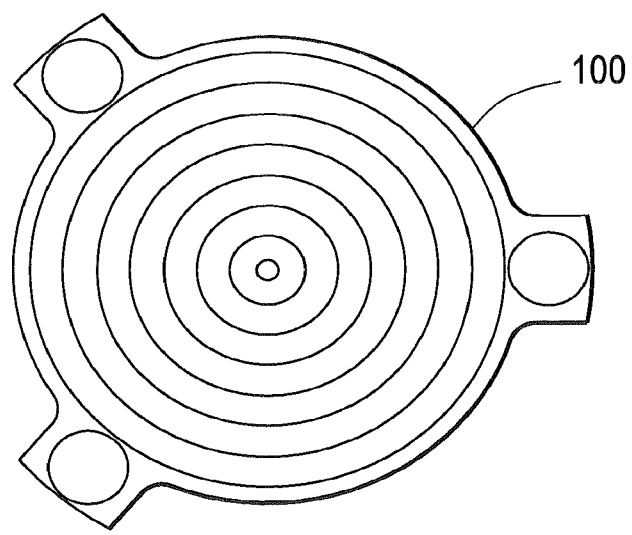
FIG. 5 is a bottom view of a concentric ring commutator of the second embodiment.
Figure 6:
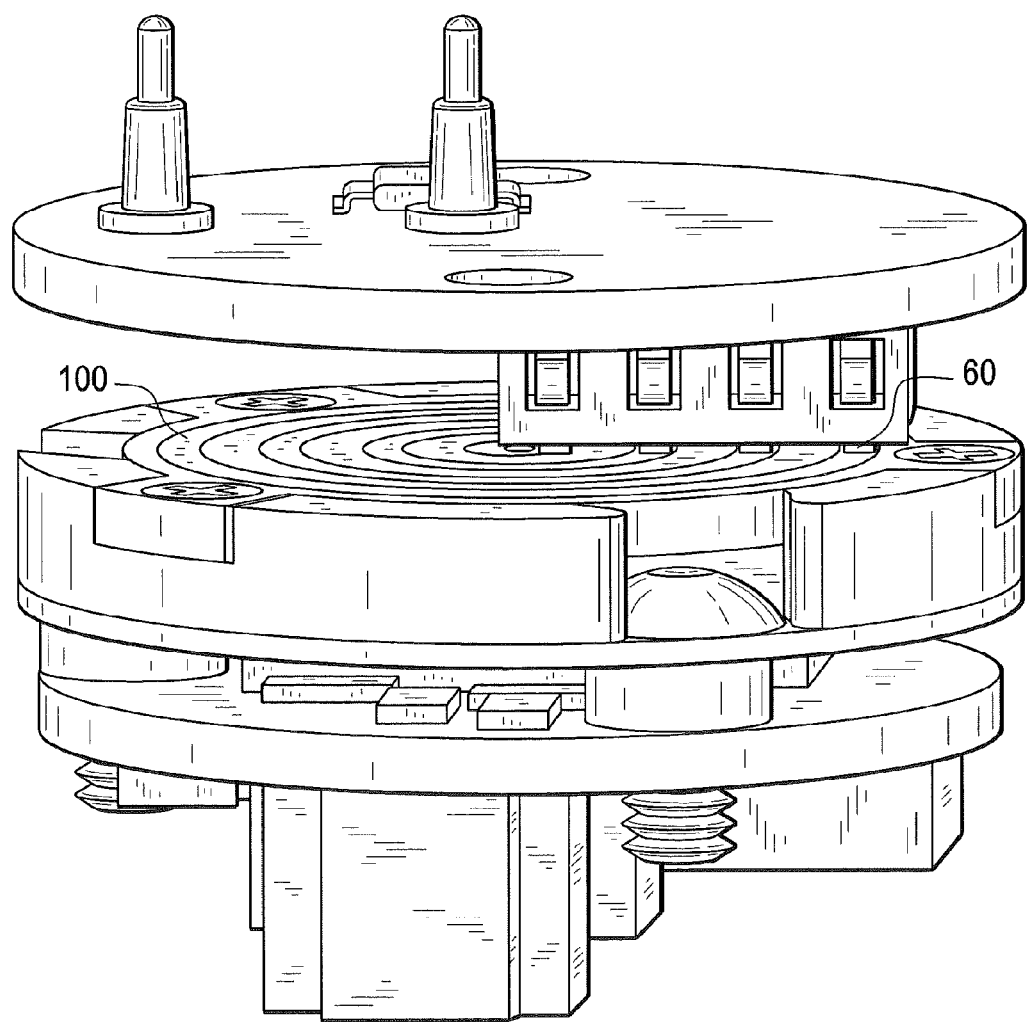
FIG. 6 is a perspective view of a connector having a concentric ring commutator of the second embodiment.
Figure 7:
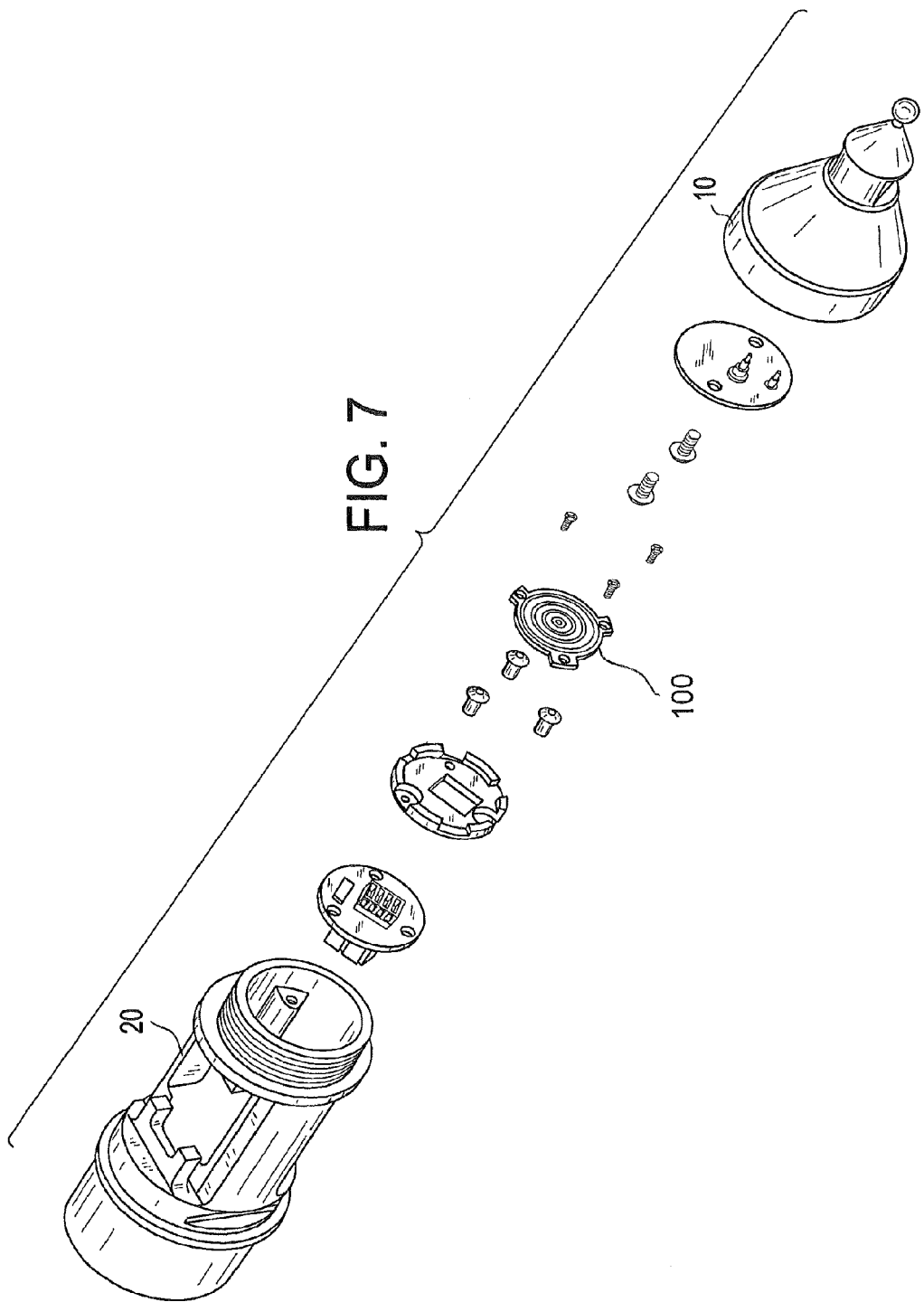
FIG. 7 is an exploded view of a probe body with a connector having a concentric ring commutator of the second embodiment.
Figure 8:
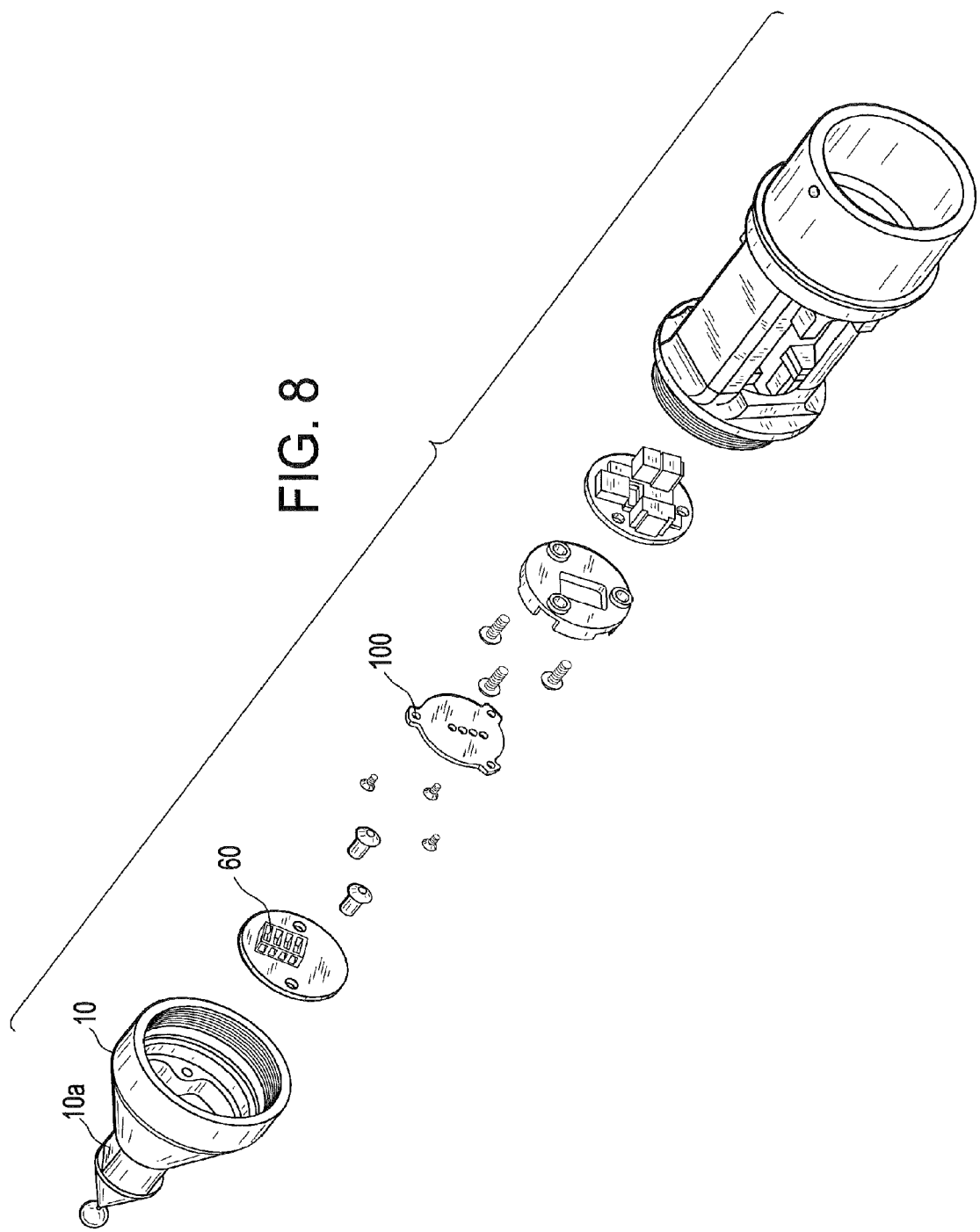
FIG. 8 is an exploded view of a probe body with a connector having a concentric ring commutator of the second embodiment.
Figure 9:
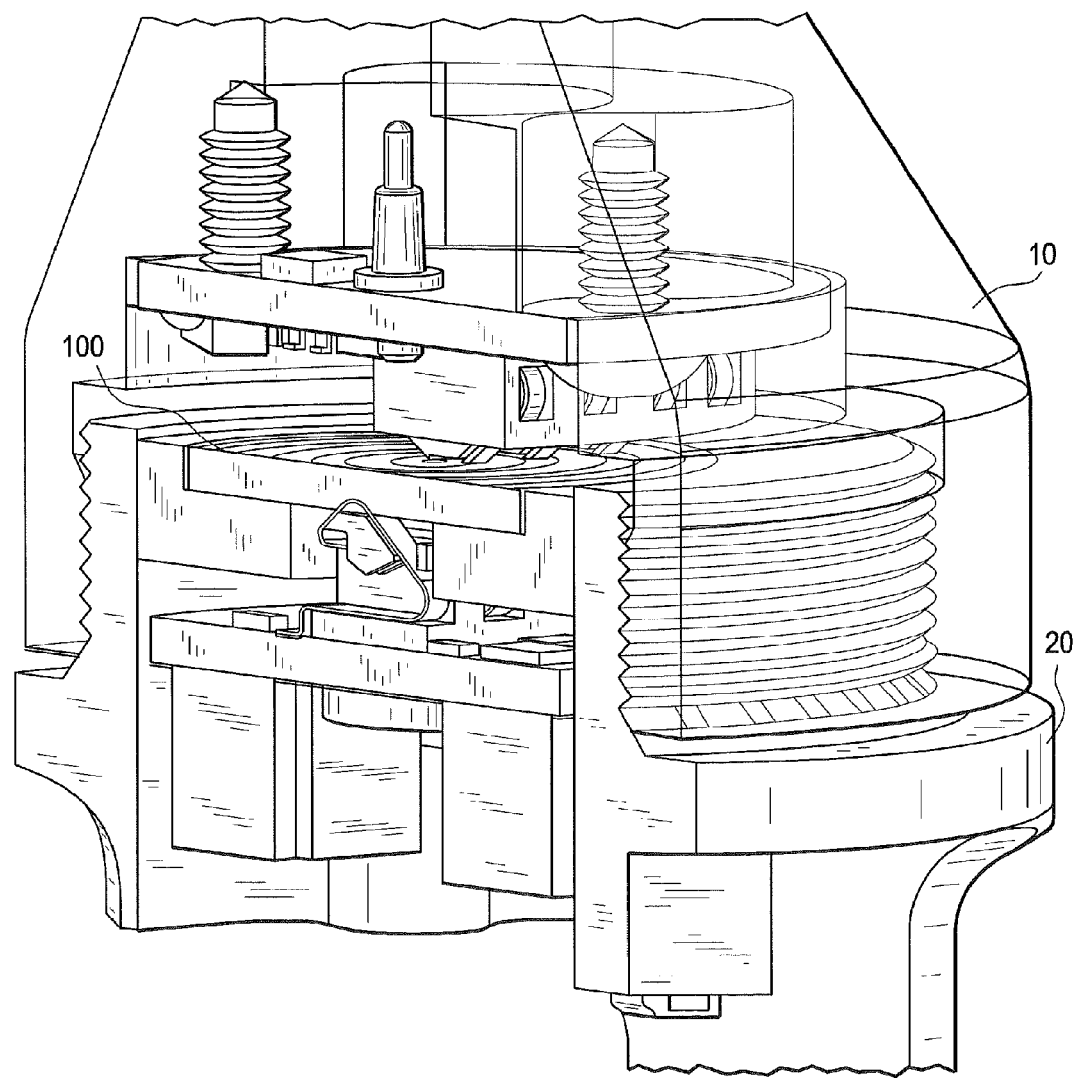
FIG. 9 is a sectional view of a probe body with a connector having a concentric ring commutator of the second embodiment.

With reference to FIGS. 2-3, a first embodiment of the present system is an "intelligent" probe system comprising an embedded IC chip 15 located in an interchangeable probe(s) 10 which offers repeatable, fast, easy, and error free probe swapping on the CMM 30 as each probe 10 is "electronically serialized" with the embedded IC chip 15 and an electronic serial number. The IC chip 15 also contains a memory buffer that stores the probe's attributes, information specific to the characteristics of the probe, and calibration data specific to a CMM.

Figure 10:
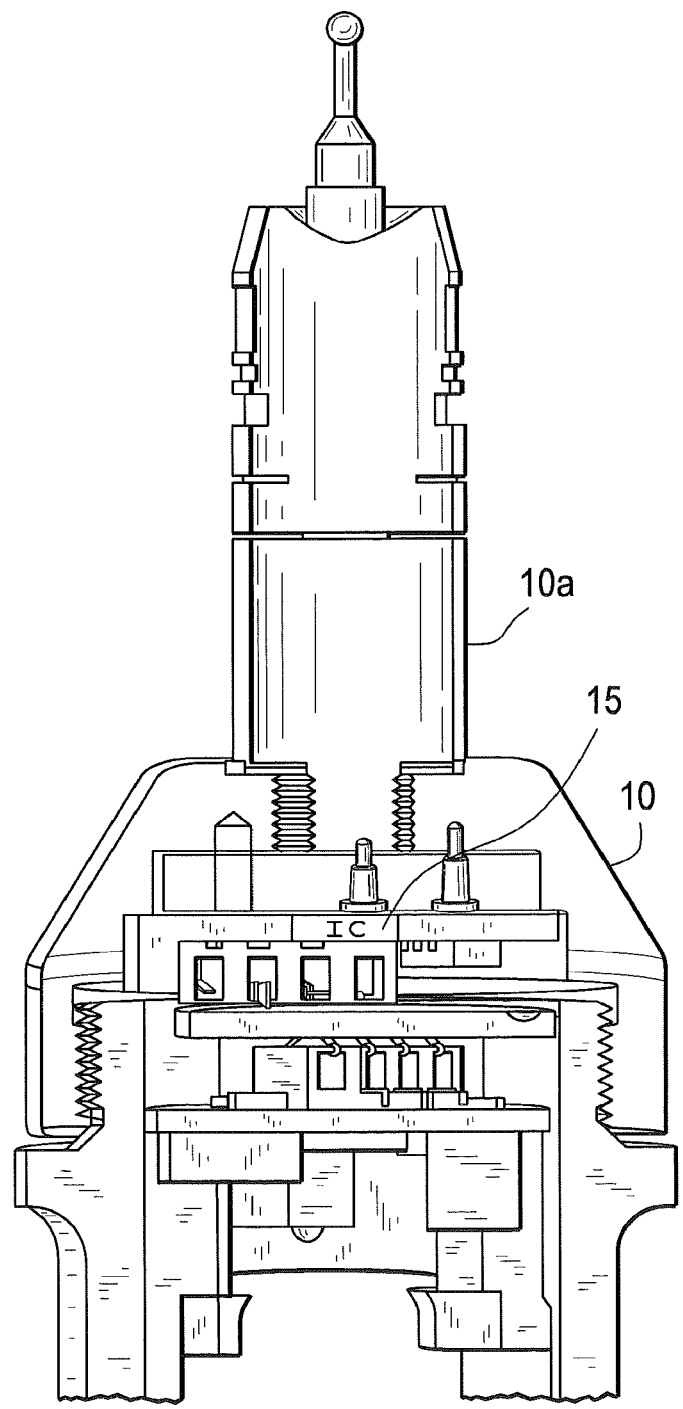
FIG. 10 is a sectional view of a probe body with a connector having a concentric ring commutator of the second embodiment.
Figure 11:
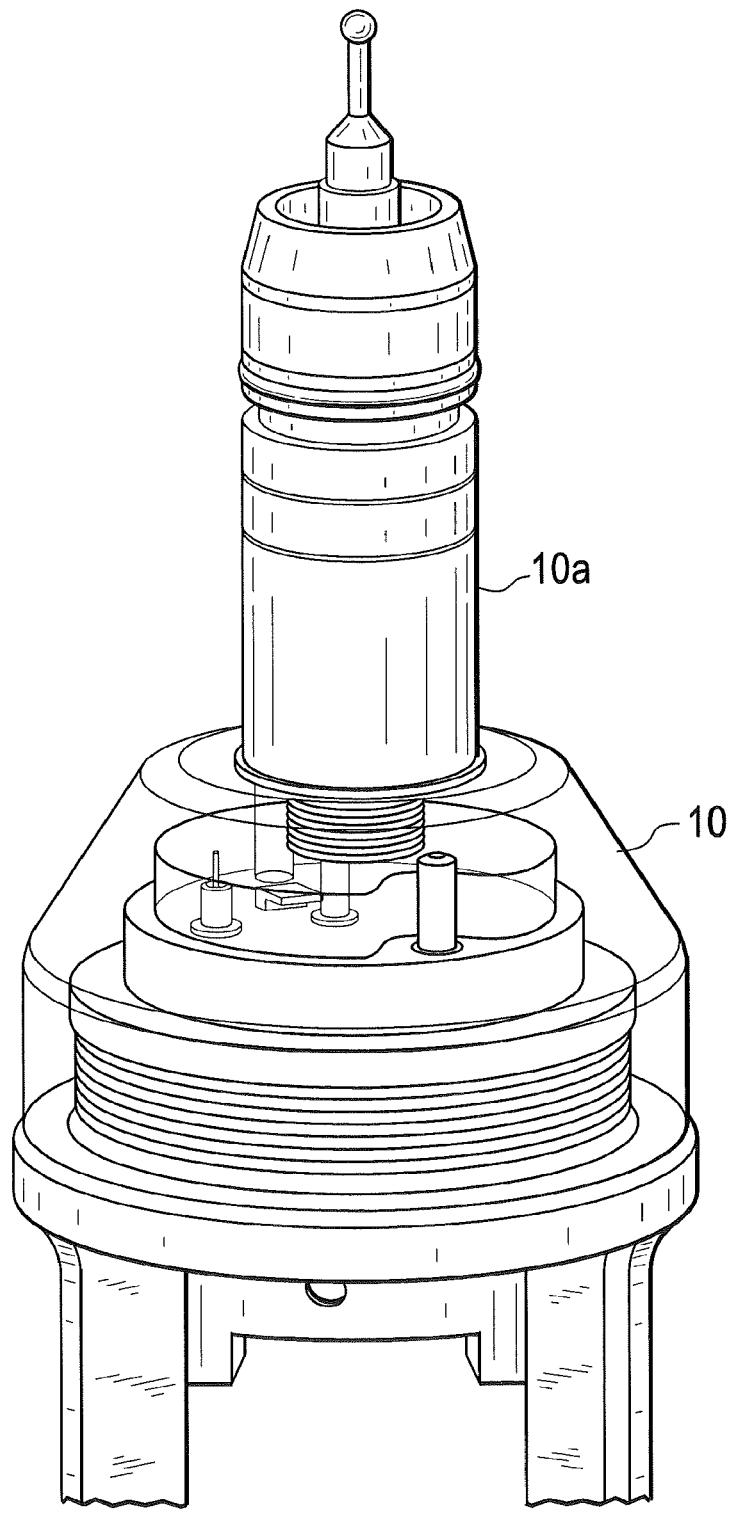
FIG. 11 is a sectional view of a probe body with a connector having a concentric ring commutator of the second embodiment.

As shown in FIG. 10, it is also possible for the IC chip 15 to be located in an adapter probe body 10 which would be attached between a standard "dumb" probe tip 10a and a CMM arm 20. Therefore, the specific location of the IC chip is not limited and may be placed anywhere in the present invention.

Referring to the first embodiment shown in FIG. 2, when attached onto the CMM arm 20, the embedded IC chip 15 not only identifies the size and type of probe 10, but it ties a specific set of calibration data to a combination of probe 10 and CMM arm 20 for example. Thus, the same probe 10 may be used on multiple CMM arms 20, and each calibration set will be unique for a particular serial numbered probe/arm combination thus ensuring maximum accuracy.

Calibration data may be created via a probe calibration at any time. This new data will be saved on and will remain with the CMM arm 20, or be saved in a memory in the IC chip 15 on the probe 10 depending upon the application. Each arm can retain data for multiple probes, or all the necessary data can be stored in the probe if desired.

Figure 14:
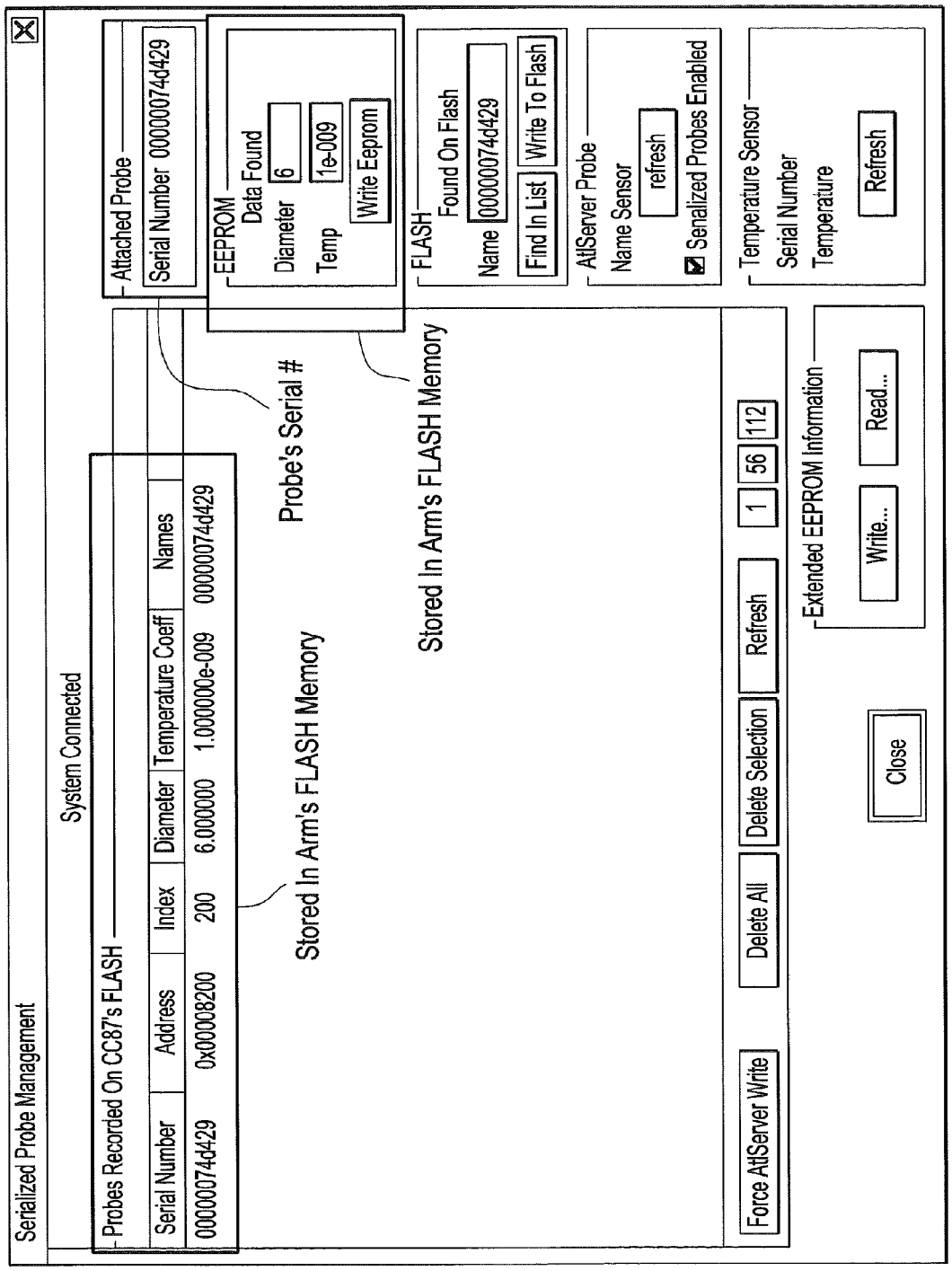
FIG. 14 shows a screen shot of one embodiment of software that may be associated with the present system

Calibration data and probe data or information to be transferred from for example an EEPROM IC CHIP 15 (located somewhere in the probe or remotely) to make the system "smart," may include, but is not limited to, tip diameter, coefficient of thermal expansion (CTE), probe type (for example hard probe or mechanical touch probe or other type), ball diameter, and "x, y, z, offsets" and/or six degrees of freedom for the probe either by itself and/or when it is connected to a particular CMM and may be dependent upon the individual configuration and programming. This can all be indexed to a serial number for example and/or any data format may be used. Thus, when the smart probe 10 is connected to the CMM arm 20 all of the necessary calibration and probe data is automatically transferred. FIG. 14 shows a screen shot of one embodiment of software associated with the present system wherein the probe's serial number is read and then indicates the tip diameter to be 6 mm, and the temperature coefficient of thermal expansion (CTE) to be 1.0 e-009 for example. However, any relevant data fields may be configured to be read based on the user's preferences and the configurations and thus the invention is not limited to the configuration shown in this screen shot.

Additionally, a calibration ball, a hole, or artifact may be measured by the system to perform an arm calibration or other calibration as well and these calibration methods are well known in robotics and thus not discussed further herein.

Probes 10 may take many additional and different shapes and forms as needed (not shown). However, using the present "smart probe" system, the probes 10 may be changed at any time without performing another probe calibration. Specifically, upon mating with electrical connection section 40 having any desired orientation of electrical contacts 60, the probe 10 serial number will automatically be detected and proper calibration data will be called by the system computer 50 or other suitable means, and used by CAM Measure software for example for operation of the CMM 30. No menu selection of probes will be required so long as electronically serialized probes are used. Thus, the probe is automatically recognized or installed and the CMM arm 20 and probe 10 combination is automatically calibrated in a "plug and play" fashion as the system uses the serial number to reference calibration data specific to the probe and correlates that to the operational kinematics.

Many different connection structures are encompassed by and will be suitable for use with the present invention. Thus, the possible types of connectors or connection structures are not limited in any way by the below description of embodiments.

For example in the first embodiment, shown in FIGS. 2 and 3, a three ball 70 kinematic mount connection structure with pin 80 is shown. In this embodiment, pin 80 is slid into hole 81 to align the electrical contacts 60 and then a rotatable threaded ring 85 is screwed down to hold the probe 10 onto electrical connection section 40 of the CMM arm 20.

It is important to note that in FIG. 2, IC chip 15 is shown within probe body 10a simply for convenience. However, often times probe tip 10a may be a "dumb" probe tip supplied by any "dumb" probe tip manufacturer. The dumb probe tip 10a is then simply connected to a probe 10 that would contain a programmable IC chip 15 (not shown) is this case. The IC chip would have to be initially programmed with the properties and dimensions of the dumb probe body 10a, but after this is done, a smart probe 10 (with the dumb probe body attached) has been effectively created. Thus, probe 10 is more like an "adapter" in this case because any dumb probe made by anyone can be attached to probe 10. FIG. 10 shows this very clearly in one embodiment wherein "smart" probe 10 accepts the threaded dumb probe tip 10a.

As shown in FIGS. 4-9, a second embodiment connection structure is shown. In this embodiment, a "screw on" probe is used to make the electrical connection between electrical contacts and a concentric ring commutator 100. Thus, the probe 10 is simply screwed onto the CMM arm 20. This version also has four electrical contacts.

Additionally, the probe 10 may be "dynamically configurable" so that any stored programs, calibrations, software, data, algorithms or other information can be easily updated or changed. For example, if particular data is used with the probe, since probe 10 has embedded IC chip 15 with a memory capability for example, the data used with the probe may be easily updated in the probe. Alternatively, the updated data could be present in the computer 50 or other means in the CMM 30 and then probe 10 and IC chip 15 could be updated when it is connected to the CMM arm 20. This offers an enormous time savings and flexibility over the "dumb probes" of the prior art.

Also, if a serialized probe 10 is attached to a CMM arm 20 where no prior calibration data has been collected, the user will be required to perform a probe calibration. The data will be saved in any desired location including in the probe 10 for example, and the probe calibration for this arm/probe combination will not be required again.

If standard (non serialized) probes are to be used on the CMM arm, a connector cover could be installed and manual menu selection of the probe size will be required.

Thus, by using the present system, an operator may quickly change the probe 10 size and shape to obtain optimal accuracy for different features. Without the present system, whenever a probe 10 is changed, the CMM and/or probe must be recalibrated. Thus, with the present system, probes may be changed at any time without performing another probe calibration.

Since calibration data is specific to an arm-probe combination, the same probe may be used on multiple arms. Each calibration data set will be unique for a particular serial numbered probe/arm combination thus ensuring maximum accuracy.

Calibration data may be created via a probe calibration at any time. This new data may be saved on and will remain with the arm, or within the probe itself.

Of course, if the operator doubts that a newly connected probe is calibrated correctly, a probe calibration may be performed as an additional step. However, because the present smart probe system includes IC chip 15, any probe calibration will be simplified because known or fixed variables such as the probe tip diameter, and the probe length will already be fixed and known and thus these variables will not have to be computed or measured in the probe calibration.

Each CMM arm 20 may also retain data for any probe that has been calibrated on it and which may be viewed or updated on display terminal 50. A database (not shown) may also be present in the CMM 20 or may be located in remote location and may be accessible by wireless or other means.

Essentially, any type of probe can be manufactured with the present system feature. Renishaw™ probes using contact switch technology are obvious types of alternate configurations that will benefit from the technology. Specific contact directions that affect the probe performance can be stored inside the IC, thus improving accuracy and performance of the system.

The present system may also be used with and to improve the systems disclosed in U.S. Pat. Nos. 6,931,745, 5,829,148 and 6,920,697 and many other CMM's and measurement systems for example.

The system may also periodically interrogate the probe 10 for presence to ensure it has not been removed or changed and thereby maintain integrity of the system and each measurement.

Software may configure the operation of the CMM arm 20 to use a probe without the present smart probe 10 system. However, the probe must be calibrated before use and there is no way for the system to detect when a probe has been changed, which is common source of error. In contrast, software can automatically configure the operation of the application whenever the present smart probe 10 is attached.

The probe 10 may be mounted on the CMM 30 or other measurement device by the means of a kinematic mount. The kinematic mount ensures that the probe is installed exactly the way it was during initial calibration. The kinematic mount may comprise three equally spaced balls mounted on the measurement device and three tapered slots in the probe 10. A pin 80 is used to ensure that the three balls 70 always return to the same slots they were in during initial calibration.

Intelligent Probes and Probe Types

Additionally, the scope of a smart probe 10 is expanded to include the provision of more sophisticated probes. The intelligence embedded in the end effector will include parametrics for not only the probe type and attributes, it includes the ability to store attribute data for articulators. Use with different systems, is a learning process that once used, will not have to be taught the information again. Thus, the probe 10, is a true "plug and play" type of probe.

Furthermore, the probe itself is not limited to hard contact effectors, but active and dynamic sensors, and the complexity of multiple sensors. For instance a temperature sensor could be easily embedded into the contactor to measure artifact temperature and render isotherm profiles. The same temperature sensor probe could easily identify to the system, when a surface is contacted and report the point at contact. Other sensor types are conceived as physical transducers for pressure, resistive, capacitive, optical, magnetic, electromagnetic, radio and sonic sensing means.

For example, a part temperature measurement system may be added to the CMM arm. This could be an I/R, non-contact temperature measurement system built into the end of the arm or into a probe or other arrangement, or a fast response temperature sensor in the probe tip that could measure a part temperature with a few milliseconds of touching the part. In both cases, it is envisioned to collect temperature data, not only of the part, but of the section of the part being measured. This temperature data would be linked to the measurement data in real time for later analysis with the intent of generating a temperature profile of the part in CAD, and/or providing data for temperature compensation of the measurement data. As an example, large equipment companies sometimes measure parts (like an airplane wing) that are part in sun and part in shade. Also, large parts may take a long time to measure, thus a set of data may be taken over several hours as temperatures change. By collecting temperature data automatically with each measurement, for the point on the part measured, a temperature profile could be constructed and used to compensate measurements. Thus, the temperature measurement device may be integrated into the arm, and collects both temperature data and measurement data simultaneously. Currently, if part temperature is measured, it is usually done with a separate piece of equipment at a single point in time.

Figure 12:
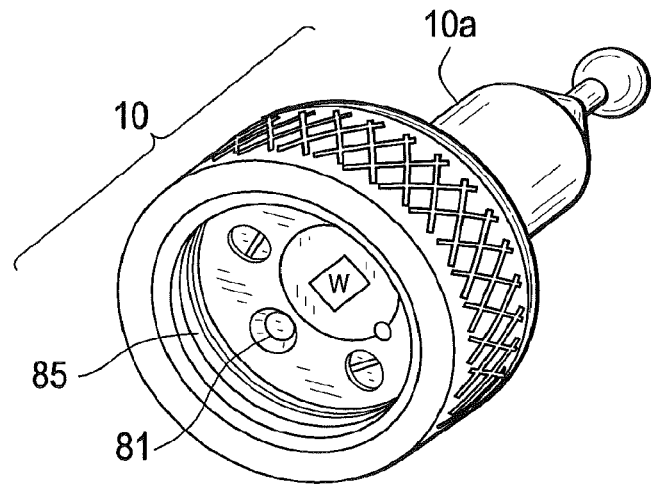
FIG. 12 is a perspective view of a probe body with a wireless connector of a third embodiment.
Figure 13:
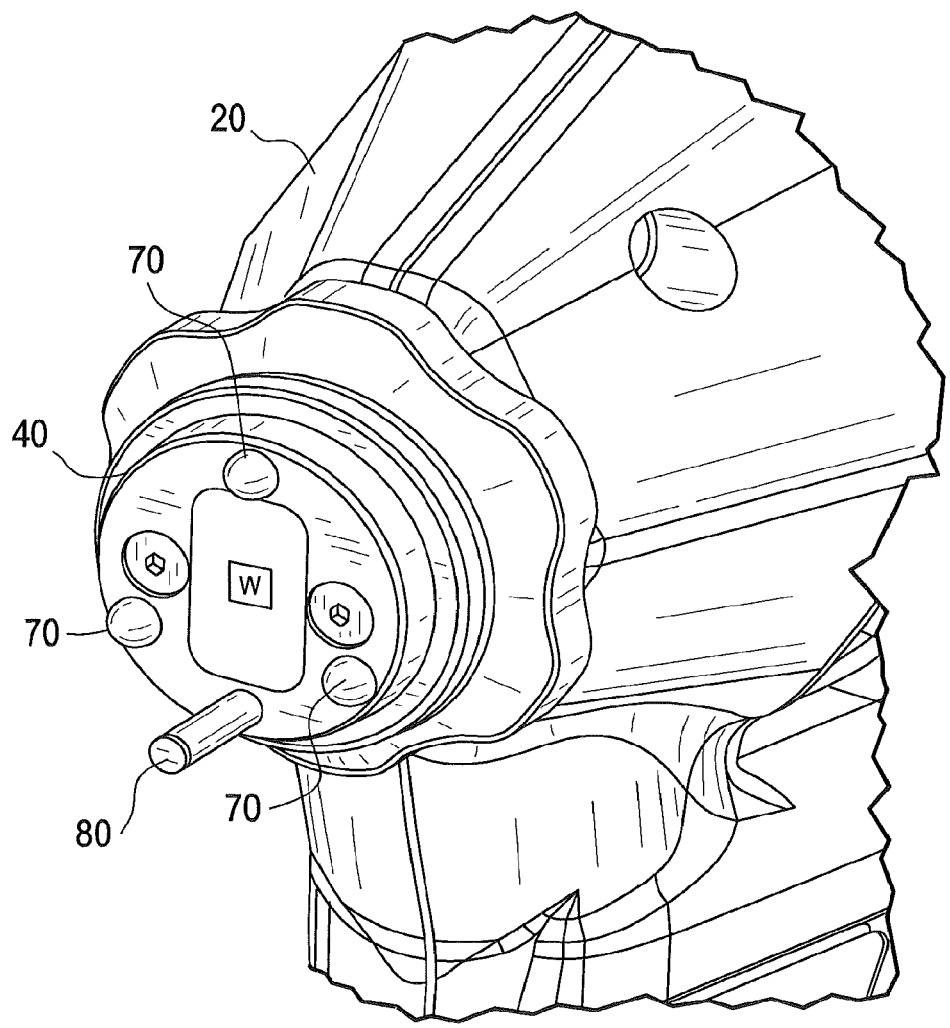
FIG. 13 is a sectional view of a CMM arm with a wireless connector of a third embodiment.

As shown in the third embodiment shown in FIGS. 12 and 13, wireless technologies shown by "W" in the figures, may also be used between any of the parts of the CMM, such as between the probe tip 10a, probe body 20, and the CMM 20 or between the CMM and a laptop computer or anywhere that wires are desired to be eliminated. Some of the common wireless standards are discussed below, however any appropriate wireless standard or radio frequency may be used.

For example, RFID may be a possible wireless "smart probe" implementation. Radio-frequency identification (RFID) is an automatic identification method, relying on storing and remotely retrieving data using devices called RFID tags or transponders. An RFID tag is an object that can be stuck on or incorporated into a product, animal, or person for the purpose of identification using radiowaves. Some tags can be read from several meters away and beyond the line of sight of the reader.

Most RFID tags contain at least two parts. One is an integrated circuit for storing and processing information, modulating and demodulating a (RF) signal and can also be used for other specialized functions. The second is an antenna for receiving and transmitting the signal. A technology called chipless RFID allows for discrete identification of tags without an integrated circuit, thereby allowing tags to be printed directly onto assets at lower cost than traditional tags. This system may easily be substituted into the present invention.

Some of the common wireless standards are discussed below, however any appropriate wireless standard or radio frequency may be used.

IEEE 802.11. (WLAN)

802.11 refers to a family of specifications developed by the IEEE for wireless LAN technology 802.11 specifies an over-the-air interface between a wireless client and a base station or between two wireless clients.

The IEEE accepted the specification in 1997.

There are several specifications in the 802.11 family:

802.11—applies to wireless LANs and provides 1 or 2 Mbps transmission in the 2.4 GHz band using either frequency hopping spread spectrum (FHSS) or direct sequence spread spectrum (DSSS).

802.11a—an extension to 802.11 that applies to wireless LANs and provides up to 54 Mbps in the 5 GHz band. 802.11a uses an orthogonal frequency division multiplexing encoding scheme rather than FHSS or DSSS.

802.11b (also referred to as 802.11 High Rate or Wi-Fi—an extension to 802.11 that applies to wireless LANS and provides 11 Mbps transmission (with a fallback to 5.5, 2 and 1 Mbps) in the 2.4 GHz band. 802.11b uses only DSSS.

802.11b was a 1999 ratification to the original 802.11 standard, allowing wireless functionality comparable to Ethernet.

802.11g—applies to wireless LANs and provides 54 Mbps in the 2.4 GHz band. 802.11g specification employs orthogonal frequency division multiplexing (OFDM), the modulation scheme used in 802.11a to obtain higher data speed. Computers or terminals set up for 802.11g can fall back to speeds of 11 Mbps. This feature makes 802.11b and 802.11g devices compatible within a single network.

Note: there are other alpha designations such as e, f, h, i, j, k, m and n which are used to denote refinements such as security, interoperability, interference resolution and documentation.

802.11g is the most widely and commonly available technology.

IEEE 802.15 (WPAN)

802.15 is a communications specification that was approved in early 2002 by the Institute of Electrical and Electronics Engineers Standards Association (IEEE-SA) for wireless personal area networks (WPANs).

The IEEE 802.15 Working Group proposed two general categories of 802.15, called TG4 (low rate) and TG3 (high rate). The TG4 version provides data speeds of 20 Kbps or 250 Kbps. The TG3 version supports data speeds ranging from 1.1 Mbps to 55 Mbps.

802.15.4 (ZigBee) falls into the TG4 group while Bluetooth the TG3. ZigBee plays a major role for remote sensors.

802.15.1 Bluetooth

Bluetooth is a short-range, radio-based wireless technology used to eliminate cables.

Whereas 802.11 (Wi-Fi) is a connectivity solution designed to eliminate Ethernet wiring within a home or office, Bluetooth is a solution designed to eliminate USB and parallel printer cables. It also eliminates other short wired connections, such as cables that link a headset, keyboard or mouse to a PDA or cellular phone.

Bluetooth-enabled products communicate via "ad hoc" short range networks known as piconets. Piconets are established dynamically as Bluetooth devices come within range of each other.

Note: A unique Bluetooth Device Address (BD_ADDR) is required for every device. The IEEE assigns one part, the Organizationally Unique Identifier (OUI), and the manufacturer the Extension Identifier (EI) part. Each is 24 bits in length. The 24-bit EI gives the manufacture 16 million BD_ADDRs per OUI block.

Bluetooth raw data rates are:
Version 1.1=1 Mbps
Version 2.0+ EDR (Extended Data Rate) 3 Mbps
Bluetooth Range:
Class 3 (1 mW)—1 m (3 feet) minimum.
Class 2 (2.5 mW)—10 m (30 feet) minimum
Class 1 (100 mW)—100 m (300 feet) minimum.

A good choice for at least an embodiment of this invention may be to use a combination of 802.11b/g and Bluetooth.

A present implementation of the probe interface allows for a zero-volt reference (power common), programmable power supply with digital and linear feedback, and a serial data path. The serial data is used for the smart probe communication; while the power pin is implemented to provide feedback for the Renishaw™ probe switch. The power pin can be used to supply energy to other active probes as necessary as referenced above.

One of ordinary skill in the art can appreciate that a computer or other client or server device can be deployed as part of a computer network, or in a distributed computing environment. In this regard, the methods and apparatus described above and/or claimed herein pertain to any computer system having any number of memory or storage units, and any number of applications and processes occurring across any number of storage units or volumes, which may be used in connection with the methods and apparatus described above and/or claimed herein. Thus, the same may apply to an environment with server computers and client computers deployed in a network environment or distributed computing environment, having remote or local storage. The methods and apparatus described above and/or claimed herein may also be applied to standalone computing devices, having programming language functionality, interpretation and execution capabilities for generating, receiving and transmitting information in connection with remote or local services.

The methods and apparatus described above and/or claimed herein is operational with numerous other general purpose or special purpose computing system environments or configurations. Examples of well known computing systems, environments, and/or configurations that may be suitable for use with the methods and apparatus described above and/or claimed herein include, but are not limited to, personal computers, server computers, hand-held or laptop devices, multiprocessor systems, microprocessor-based systems, network PCs, minicomputers, mainframe computers, distributed computing environments that include any of the above systems or devices.

The methods described above and/or claimed herein may be described in the general context of computer-executable instructions, such as program modules, being executed by a computer. Program modules typically include routines, programs, objects, components, data structures, etc. that perform particular tasks or implement particular abstract data types. Thus, the methods and apparatus described above and/or claimed herein may also be practiced in distributed computing environments such as between different power plants or different power generator units where tasks are performed by remote processing devices that are linked through a communications network or other data transmission medium. In a typical distributed computing environment, program modules and routines or data may be located in both local and remote computer storage media including memory storage devices. Distributed computing facilitates sharing of computer resources and services by direct exchange between computing devices and systems. These resources and services may include the exchange of information, cache storage, and disk storage for files. Distributed computing takes advantage of network connectivity, allowing clients to leverage their collective power to benefit the entire enterprise. In this regard, a variety of devices may have applications, objects or resources that may utilize the methods and apparatus described above and/or claimed herein.

Computer programs implementing the method described above will commonly be distributed to users on a distribution medium such as a CD-ROM. The program could be copied to a hard disk or a similar intermediate storage medium. When the programs are to be run, they will be loaded either from their distribution medium or their intermediate storage medium into the execution memory of the computer, thus configuring a computer to act in accordance with the methods and apparatus described above.

The term "computer-readable medium" encompasses all distribution and storage media, memory of a computer, and any other medium or device capable of storing for reading by a computer a computer program implementing the method described above.

Thus, the various techniques described herein may be implemented in connection with hardware or software or, where appropriate, with a combination of both. Thus, the methods and apparatus described above and/or claimed herein, or certain aspects or portions thereof, may take the form of program code or instructions embodied in tangible media, such as floppy diskettes, CD-ROMs, hard drives, or any other machine-readable storage medium, wherein, when the program code is loaded into and executed by a machine, such as a computer, the machine becomes an apparatus for practicing the methods and apparatus of described above and/or claimed herein. In the case of program code execution on programmable computers, the computing device will generally include a processor, a storage medium readable by the processor, which may include volatile and non-volatile memory and/or storage elements, at least one input device, and at least one output device. One or more programs that may utilize the techniques of the methods and apparatus described above and/or claimed herein, e.g., through the use of a data processing, may be implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of described above and/or claimed herein may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or a receiving machine having the signal processing capabilities as described in exemplary embodiments above becomes an apparatus for practicing the method described above and/or claimed herein. When implemented on a general-purpose processor, the program code combines with the processor to provide a unique apparatus that operates to invoke the functionality of the methods and apparatus of described above and/or claimed herein. Further, any storage techniques used in connection with the methods and apparatus described above and/or claimed herein may invariably be a combination of hardware and software.

While preferred embodiments have been shown and described, various modifications and substitutions may be made thereto without departing from the spirit and scope of the invention. Accordingly, it is to be understood that the present invention has been described by way of illustrations and not limitation.

This written description uses examples to disclose the invention, including the best mode, and also to enable any person skilled in the art to make and use the invention. The patentable scope of the invention is defined by the claims, and may include other examples of devices, methods, and articles of manufacture that occur to those skilled in the art. Such other examples are intended at least to be within the scope of the claims if they have structural elements that do not differ from the literal language of the claims, or if they include equivalent structural elements with insubstantial differences from the literal languages of the claims and/or as allowed by law.

Furthermore, the skilled artisan will recognize the interchangeability of various features from different embodiments. Similarly, the various features described, as well as other known equivalents for each feature, can be mixed and matched by one of ordinary skill in this art.

While the preferred embodiments of the present invention have been described using specific terms, such description is for illustrative purposes only, and it is to be understood that changes and variations may be made without departing from the spirit or scope of the appended claims. The presently disclosed embodiments are therefore to be considered in all respects as illustrative and not restrictive, and all changes which come within the meaning and range of equivalency of the claims are therefore intended to be embraced therein.

What is claimed is:

1. A method for creating a plurality of smart probes for an articulated arm coordinate measurement machine, the method comprising:

providing an articulated arm coordinate measurement machine, a smart adapter, a first dumb probe, and a second dumb probe, the smart adapter including an adapter probe body, an integrated circuit, a memory, and an electrical connector, the first dumb probe and the second dumb probe configured to couple to the smart adapter, the smart adapter configured to couple to the articulated arm coordinate measurement machine;

attaching the smart adapter to the articulated arm coordinate measurement machine;

storing properties and dimensions of the first dumb probe in the memory;

storing properties and dimensions of the second dumb probe in the memory;

attaching the first dumb probe to the smart adapter;

measuring three-dimensional coordinates of a first point in space with the first dumb probe based at least in part on the stored properties and dimensions of the first dumb probe;

removing the first dumb probe from the smart adapter and attaching the second dumb probe to the smart adapter;

measuring three-dimensional coordinates of a second point in space with the second dumb probe based at least in part on the stored properties and dimensions of the second dumb probe;

removing the second dumb probe from the smart adapter and attaching the first dumb probe to the smart adapter; and measuring three-dimensional coordinates of a third point in space with the first dumb probe based at least in part on the stored properties and dimensions of the first dumb probe.

2. The method of claim 1 wherein, in the step of providing an integrated circuit and a memory, the memory is included within the integrated circuit.

3. A method for creating a plurality of smart sensing probes for an articulated arm coordinate measurement machine, the method comprising:

providing an articulated arm coordinate measurement machine, a smart adapter, a first sensing probe, and a second sensing probe, the smart adapter including an adapter probe body, an integrated circuit, a memory, and an electrical connector, the first sensing probe including a first sensor, the second sensing probe including a second sensor, the first sensor probe and the second sensor probe configured to couple to the smart adapter, the smart adapter configured to couple to the articulated arm coordinate measurement machine;

attaching the smart adapter to the articulated arm coordinate measurement machine;

storing properties and dimensions of the first sensor probe in the memory;

storing properties and dimensions of the second sensor probe in the memory;

attaching the first sensor probe to the smart adapter;

measuring with the first sensing probe three-dimensional coordinates of a first point and a corresponding first sensed quantity, the three-dimensional coordinates of the first point based at least in part on the stored properties and dimensions of the first sensing probe, the first sensed quantity based at least in part on a first signal from the first sensor;

removing the first sensing probe from the smart adapter and attaching the second sensing probe to the smart adapter;

measuring with the second sensing probe three-dimensional coordinates of a second point and a corresponding second sensed quantity, the three-dimensional coordinates of the second point based at least in part on the stored properties and dimensions of the second sensing probe, the second sensed quantity based at least in part on a second signal from the second sensor;

removing the second sensing probe from the smart adapter and attaching the first sensing probe to the smart adapter; and measuring with the first sensing probe three-dimensional coordinates of a third point and a corresponding third sensed quantity, the three-dimensional coordinates of the third point based at least in part on the stored properties and dimensions of the first sensing probe, the third sensed quantity based at least in part on a third signal from the first sensor.

4. The method of claim 3 wherein, in the step of providing an integrated circuit and a memory, the memory is included within the integrated circuit.

5. The method of claim 3 wherein, in the step of providing a first sensor, the first sensor is selected from the group consisting of a temperature sensor, a pressure sensor, a resistive sensor, a capacitive sensor, an optical sensor, a magnetic sensor, an electromagnetic sensor, a radio sensor, and a sonic sensor.

* * * * *